(12) United States Patent
Nomura et al.

(10) Patent No.: US 9,083,911 B2
(45) Date of Patent: Jul. 14, 2015

(54) NOZZLE SHADING METHOD, AND AN INKJET PRINTING APPARATUS USING SAME

(71) Applicant: Dainippon Screen Mfg. Co., Ltd., Kyoto-shi, Kyoto (JP)

(72) Inventors: Seiya Nomura, Kyoto (JP); Kazuki Fukui, Kyoto (JP); Hiroyuki Fuchioka, Kyoto (JP); Kunio Muraji, Kyoto (JP)

(73) Assignees: SCREEN HOLDINGS CO., LTD., Kyoto (JP); RICOH COMPANY, LTD., Tokyo (JP)

( * ) Notice: Subject to any disclaimer, the term of this patent is extended or adjusted under 35 U.S.C. 154(b) by 49 days.

(21) Appl. No.: 13/629,302

(22) Filed: Sep. 27, 2012

(65) Prior Publication Data
US 2013/0076823 A1 Mar. 28, 2013

(30) Foreign Application Priority Data
Sep. 27, 2011 (JP) ................................. 2011-210805

(51) Int. Cl.
| | | |
|---|---|---|
| B41J 29/38 | (2006.01) | |
| H04N 1/40 | (2006.01) | |
| B41J 2/21 | (2006.01) | |
| H04N 1/00 | (2006.01) | |
| H04N 1/401 | (2006.01) | |

(52) U.S. Cl.
CPC ........... *H04N 1/40025* (2013.01); *B41J 2/2142* (2013.01); *B41J 2/2146* (2013.01); *H04N 1/00015* (2013.01); *H04N 1/00031* (2013.01); *H04N 1/00045* (2013.01); *H04N 1/00053* (2013.01); *H04N 1/4015* (2013.01)

(58) Field of Classification Search
CPC ........................................ B41J 2/2132–2/2146
USPC .......................... 347/14, 19; 358/1–540, 3.23
See application file for complete search history.

(56) References Cited

U.S. PATENT DOCUMENTS

| | | | | |
|---|---|---|---|---|
| 7,619,785 | B2 * | 11/2009 | Sodeura et al. | 358/474 |
| 7,626,738 | B2 * | 12/2009 | Yamada | 358/504 |
| 2008/0123157 | A1 * | 5/2008 | Kinoshita | 358/451 |
| 2011/0148969 | A1 * | 6/2011 | Nakamura et al. | 347/15 |
| 2011/0285780 | A1 * | 11/2011 | Yamada et al. | 347/15 |
| 2011/0316920 | A1 * | 12/2011 | Torigoe et al. | 347/14 |
| 2012/0300270 | A1 * | 11/2012 | Honglin | 358/475 |

FOREIGN PATENT DOCUMENTS

| | | | | |
|---|---|---|---|---|
| JP | 2008-238419 | * | 9/2008 | B41J 2/01 |
| JP | 2008-238419 | A | 10/2008 | |

* cited by examiner

*Primary Examiner* — Alessandro Amari
*Assistant Examiner* — Michael Konczal
(74) *Attorney, Agent, or Firm* — McDermott Will & Emery LLP

(57) ABSTRACT

An inkjet printing apparatus includes a plurality of nozzles for discharging ink, a CIS (Contact Image Sensor) type scanner for reading, as image data, charts for correction printed in the ink discharged from the nozzles, light emitters for emitting light to the charts for correction, a scanner controller for causing the scanner to scan the charts for correction with a plurality of read conditions, a correction table creator for creating nozzle shading correction tables based on the image data read, and a shading corrector for carrying out shading correction for the nozzles based on the correction tables.

12 Claims, 10 Drawing Sheets

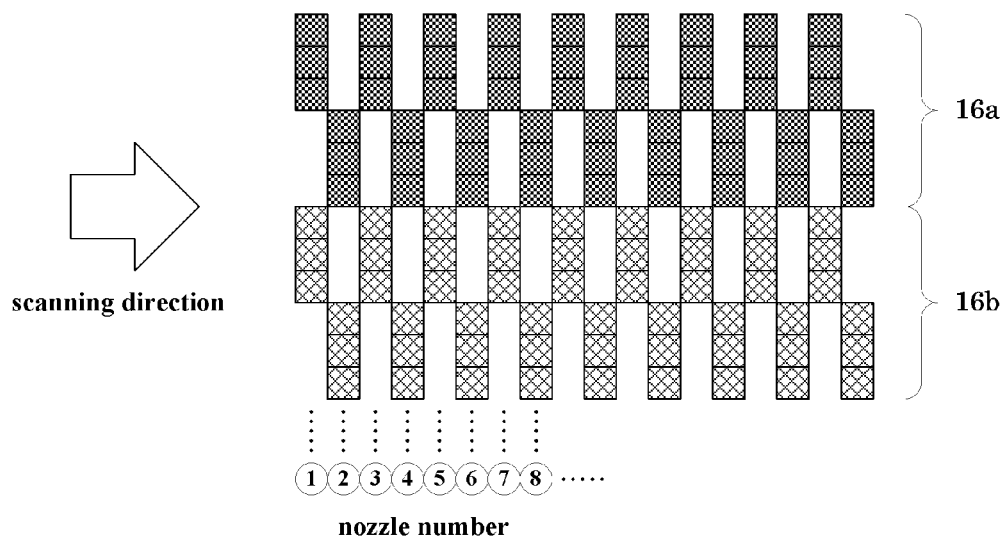
scanning direction
nozzle number
Fig.8
Fig.9
(a) timing signal
Xth line     (X+1)th line
Fig.9
(b) lighting signal
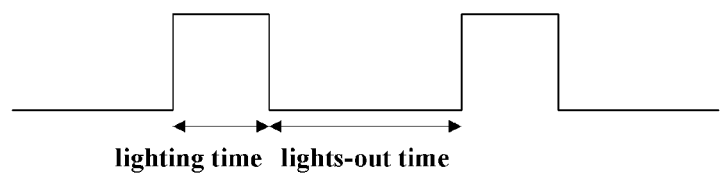
lighting time   lights-out time
Fig.9
(c) lighting signal
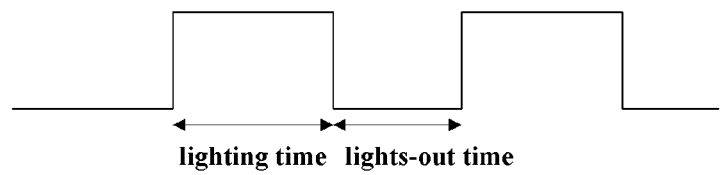
lighting time   lights-out time

NOZZLE SHADING METHOD, AND AN INKJET PRINTING APPARATUS USING SAME

BACKGROUND OF THE INVENTION (1) Field of the Invention

This invention relates to a nozzle shading method and an inkjet printing apparatus using same, and more particularly to a nozzle shading method using a scanner having a narrow dynamic range.

(2) Description of the Related Art

Conventionally, an inkjet printing apparatus is susceptible to a non-discharge in which the nozzles fail to discharge ink droplets. Therefore, a non-discharge nozzle detecting mechanism is provided for detecting the non-discharge nozzles. In Patent Document 1 (Japanese Unexamined Patent Publication No. 2008-238419), for example, prints are read by a CIS (Contact Image Sensor), and non-discharge nozzles are detected based on the images read.

With an inkjet printing apparatus, variations occur in the amount of droplets discharged from each nozzle in spite of the same tone value of image data printed. The variations in the discharge among the nozzles will produce density variations of prints (see FIG. 17). In order to eliminate the density variations, nozzle shading which is a density uniforming correction (see FIG. 18) is carried out on the nozzles. Since the nozzle shading needs a highly precise reading with a large dynamic range, prints are read with a CCD (Charge Coupled Device) scanner, and ink discharge from the nozzles are adjusted according to a variation of each nozzle.

SUMMARY OF THE INVENTION

However, a CCD scanner is expensive. When a CIS scanner is used instead of a CCD scanner for reading prints, it is difficult to acquire a gradation of density values. That is, although the CIS scanner can be used for detecting nozzle non-discharge, it cannot be used for nozzle shading. This is because the CIS scanner has CMOS sensors employed as image sensors, and has a smaller dynamic range than the CCD scanner which uses photodiodes as image sensors, wherefore the tone values required for the nozzle shading cannot be acquired.

This invention has been made having regard to the state of the art noted above, and its object is to provide a nozzle shading method and an inkjet printing apparatus using same, which are highly precise in spite of using a scanner with a small dynamic range.

The above object is fulfilled, according to a first aspect of this invention, by a nozzle shading method applicable to nozzles of an inkjet printing apparatus, comprising a reading step for reading charts for shading correction with a CIS (Contact Image Sensor) type scanner with a plurality of read conditions, while emitting light from light emitters, thereby to obtain image data; a correction table creating step for creating nozzle shading correction tables based on the image data; and a shading correcting step for carrying out shading correction based on the correction tables.

According to the invention noted above, the reading step is executed to read image data using a CIS type scanner with a plurality of read conditions, while emitting light from light emitters to charts for shading correction. In the correction table creating step, nozzle shading correction tables are created based on the image data read with the plurality of read conditions. In the shading correcting step, shading correction is carried out based on the correction tables created.

Image data is read from the charts for shading correction with the plurality of read conditions. The nozzle shading correction tables are created based on the plurality of image data read. This enables employment of the CIS type scanner having a narrow dynamic range.

A preferred example of the nozzle shading method comprises a density value converting step for converting luminance values of the image data read and corresponding to each read condition, into density values, wherein the correction table creating step is executed to create the nozzle shading correction tables based on the density values converted.

According to the above method, the density value converting step converts luminance values of the plurality of image data read with the plurality of read conditions, into density values corresponding to each read condition. The correction table creating step creates the nozzle shading correction tables based on these density values. Thus, by converting the luminance values acquired with different read conditions into density values serving as a unified reference, the correction tables for nozzle shading can be created with increased precision, thereby to improve the accuracy of nozzle shading.

In a second aspect of this invention, an inkjet printing apparatus comprises a plurality of nozzles for discharging ink; a CIS (Contact Image Sensor) type scanner for reading, as image data, charts for correction printed in the ink discharged from the nozzles; light emitters for emitting light to the charts for correction; a scanner controller for causing the scanner to scan the charts for correction with a plurality of read conditions; a correction table creator for creating nozzle shading correction tables based on the image data read; and a shading corrector for carrying out shading correction for the nozzles based on the correction tables.

According to the above construction, ink is discharged from each of a plurality of nozzles to print the charts for correction. These charts for correction are read as image data using the CIS type scanner, while emitting light from the light emitters. The reading of this image data is carried out with a plurality of read conditions. The correction table creator creates nozzle shading correction tables based on the image data read. The shading corrector carries out shading correction for the nozzles based on the correction tables created.

The image data is read from the charts for shading correction with the plurality of read conditions. The correction tables for nozzle shading are created based on the plurality of image data read. Therefore, even if the CIS type scanner having a narrow dynamic range is employed, a high-precision shading correction can be made, to realize inkjet printing with a uniformed discharge from the respective nozzles. The CIS, which is smaller and costs less than the CCD, can contribute to space-saving and cost reduction.

One example of the inkjet printing apparatus comprises conversion tables corresponding to the respective read conditions for converting luminance values of the image data read into density values, and a density value converter for converting the luminance values of the image data read into the density values, using the conversion tables, wherein the correction table creator creates the nozzle shading correction tables based on the density values converted.

According to the above construction, for the plurality of image data read with the plurality of read conditions, the density value converter converts from luminance values into density values using the conversion tables corresponding to the respective read conditions for converting from the luminance values into the density values. The correction table creator creates the nozzle shading correction tables based on these density values. Thus, by converting the luminance values acquired with different read conditions into density values serving as a unified reference, the correction tables for nozzle shading can be created with increased precision, thereby to improve the accuracy of nozzle shading.

The plurality of read conditions may be provided by changing an exposure amount of one scan. The plurality of image data can be read with varied read conditions by making a plurality of scans with the CIS type scanner while changing the exposure amount.

The plurality of read conditions may be provided by changing a relative speed between the scanner and the charts for shading correction, thereby changing an exposure amount. In time of scanning with the CIS type scanner, the relative speed between the scanner and the charts for shading correction is changed to change the time of exposure of the charts for correction, thereby changing the exposure amount. Consequently, the plurality of image data can be read with varied read conditions.

The plurality of read conditions may be provided by changing a drive current value of the light emitters, thereby changing an exposure amount. The quantity of light irradiating the charts for correction is changed by changing the drive current value of the light emitters. Consequently, by making a plurality of scans, the plurality of image data can be read with varied read conditions.

Preferably, the light emitters are LEDs. With LEDs used as the light emitters, proper luminance can be obtained while saving space.

The scanner may include a light receiver having a predetermined number of image sensors; the light receiver and at least one of the light emitters constituting a basic block; the scanner having a plurality of basic blocks; the read conditions being changed for each of the basic blocks. With the scanner having therein a plurality of basic blocks, each formed of a light receiver having a predetermined number of image sensors and at least one of the light emitters, the read condition can be changed for each basic block. Since the read conditions are different for the respective basic blocks, the plurality of image data can be read with varied read conditions, with the scanner scanning the charts for correction only once.

Preferably, the scanner includes ridges formed on bottoms of opposite ends thereof and extending parallel to a transverse direction of the scanner. Since the ridges smooth out any wrinkles of a print having the charts for shading correction printed thereon, undulations can be removed from the print, and defocusing can be prevented even when a CIS type line sensor having a shallower depth of field than CCD is used.

Thus, the nozzle shading method and the inkjet printing apparatus using same, according to this invention, are highly precise in spite of using the CIS scanner.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 8 is an explanatory view showing a print pattern of the charts for shading correction;

FIG. 9 (a) is an explanatory view showing a timing signal instructing emission of light from light emitters;

FIGS. 9 (b) and 9 (c) are explanatory views showing blinking times of the light emitters responsive to the timing signal of FIG. 9 (a);

DESCRIPTION OF THE PREFERRED EMBODIMENTS

Figure 1:
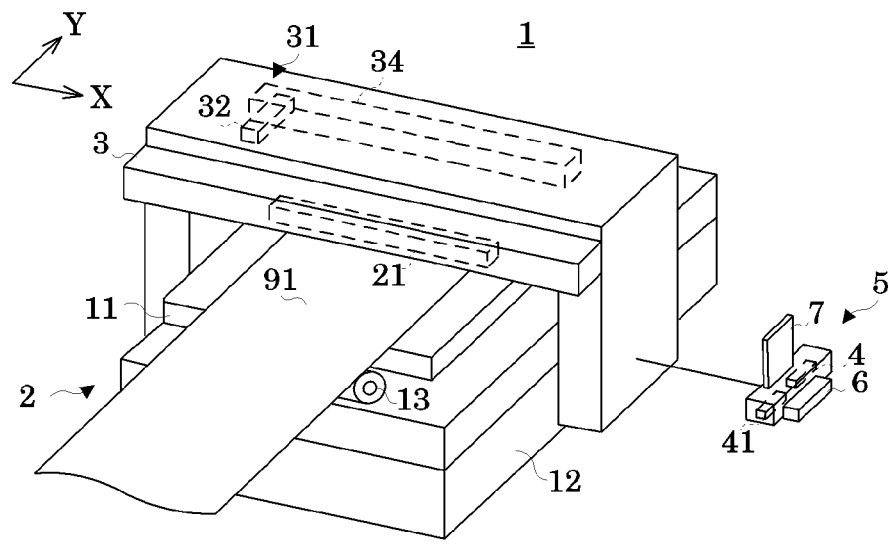
FIG. 1 is an overall perspective view of a printing apparatus according to this invention.
Figure 2:
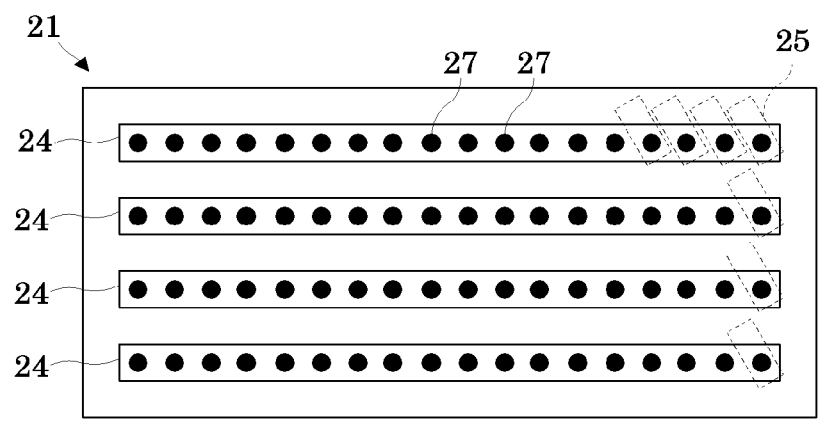
FIG. 2 is a bottom plan view of a discharge section.
Figure 2:
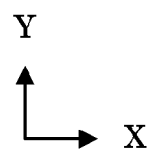
Figure 3:
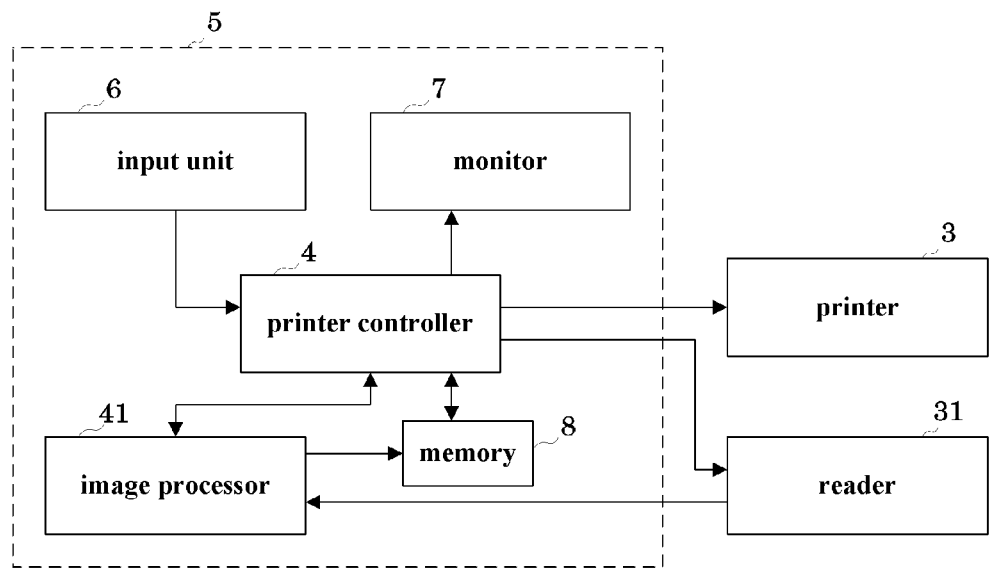
FIG. 3 is a block diagram showing a construction of the printing apparatus.

An embodiment of this invention will be described hereinafter with reference to the drawings. FIG. 1 is an overall perspective view of a printing apparatus. FIG. 2 is a bottom plan view of a discharge section. FIG. 3 is a block diagram showing a construction of the printing apparatus.

1. Printing Apparatus

The printing apparatus 1 is an inkjet printing apparatus which prints designated image data on a base material 91 by ink jet printing. In this embodiment, an inkjet printing apparatus of the one-pass type will be described by way of example. The invention may employ a printing apparatus of the multi-pass type, instead. The base material 91 may be paper, glass substrate, or plastic substrate.

The printing apparatus 1 includes a transport mechanism 2 for transporting the base material 91, a printer 3 for discharging ink and printing data on the base material 91 being transported, a printer controller 4 for controlling the printer 3, and an input unit 6 for inputting various condition settings, a monitor 7 for monitoring set conditions and operating situations, a reader 31 using a scanner for reading images printed on the base material 91, and an image processor 41 for carrying out image processing of image data read. In this embodiment, a PC (personal computer) 5 is employed as the printer controller 4, input unit 6, monitor 7, and image processor 41.

The transport mechanism 2 has a stage 11 for holding the base material 91, a base block 12 on which the stage 11 is installed, and a roller 13 for transporting the base material 91 fed from a feed roll (not shown) in (+Y) direction. Rotating speed of the roller 13 is controlled by a roller driver (not shown), and the rotating speed of the roller and discharge timing of droplets from the printer 3 are controlled.

Figure 5:
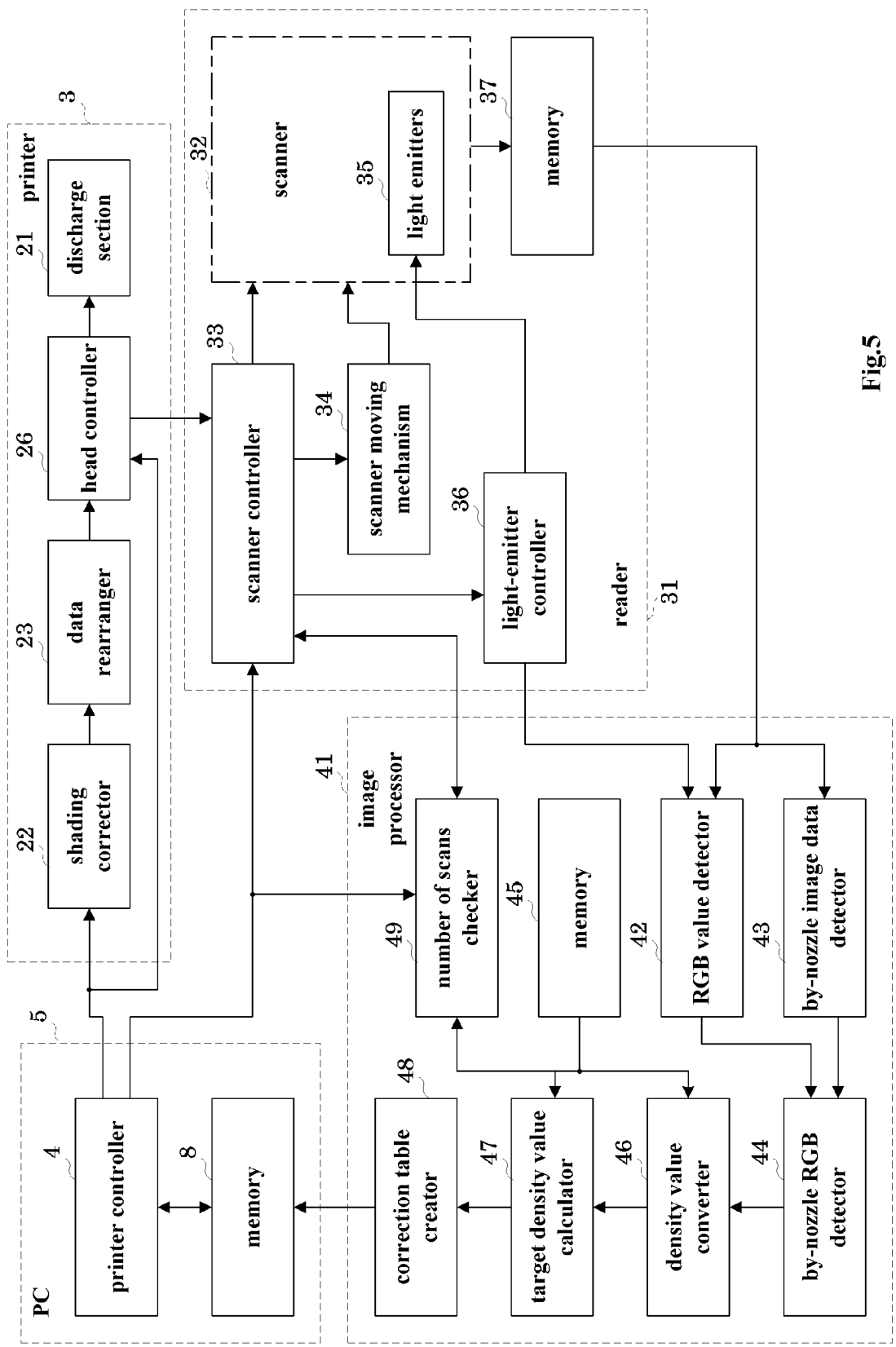
FIG. 5 is a block diagram showing the construction of the printing apparatus.

The printer 3 has a discharge section 21 for discharging the ink, a shading corrector 22 for carrying out shading correction on values of the inputted image data, a data rearranger 23 for rearranging the inputted image data, and a head controller 26 for controlling ink discharge from the discharge section 21 (see FIG. 5).

As shown in FIG. 2, the discharge section 21 has a plurality of head units 24 for discharging inks of different color components. The head units 24 are arranged in the (+Y) direction which is the transport direction of the base material 91. In order from the head unit 24 on the extreme (−Y) side to the head unit 24 on the extreme (+Y) side in FIG. 2, the head units 24 discharge the inks of Y (yellow), M (magenta), C (cyan), and K (black). The discharge section 21 may include inkjet heads of other colors, such as light cyan, light magenta, white, and so on.

Each head unit 24 has, for example, heads 25 of the piezo drive type arranged in X-direction (hereinafter called the "width direction") which is a direction perpendicular to the transport direction of the base material 91. Each head 25 has a nozzle 27 disposed on a lower surface thereof for discharging minute droplets of ink. The nozzles 27 are arranged in the width direction in the head units 24, at intervals corresponding to the resolution of the printing apparatus 1. FIG. 2 shows only part of the heads 25, and that in a sketchy way, and thus the number of nozzles 27 is not limited to what is shown.

In a printing operation, the inks are discharged while the base material 91 is transported in the (+Y) direction relative to the discharge section 21. Since each head unit 24 extends in the width direction over an entire printing area on the base material 91, printing is completed with the base material 91 moving only once in the (+Y) direction relative to the discharge section 21.

2. Reader

The reader 31 causes a scanner 32 to scan charts for shading correction printed on the base material 91 to read image data. As shown in FIG. 5, the reader 31 has the scanner 32, a scanner controller 33, a scanner moving mechanism 34, a light-emitter controller 36, and a memory 37. The scanner controller 33 and light-emitter controller 36 may be microprocessors or FPGAs (Field-Programmable Gate Arrays).

Figure 4:
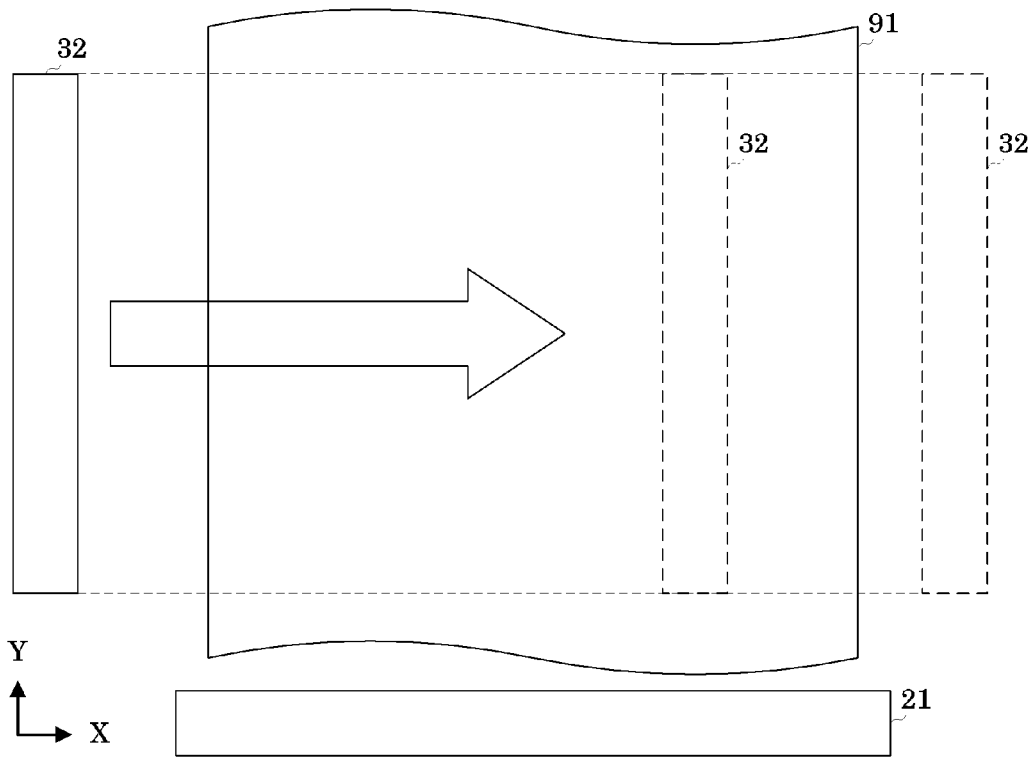
FIG. 4 is an explanatory view showing a scan direction of a scanner.

The scanner 32 scans the charts for shading correction printed in Y, M, C and K each in one color on the base material 91, and reads the image data. The scanner 32 in this embodiment is a line scanner of the CIS type. Upon instructions for scan start inputted from the scanner controller 33, the scanner 32 scans the base material 91 in the width direction (X-direction) (see FIG. 4). At this time, the scanner 32 starts reading the charts for shading correction, while emitting light from light emitters 35 disposed in the scanner 32, and stores the read image data in the memory 37.

Figure 6:
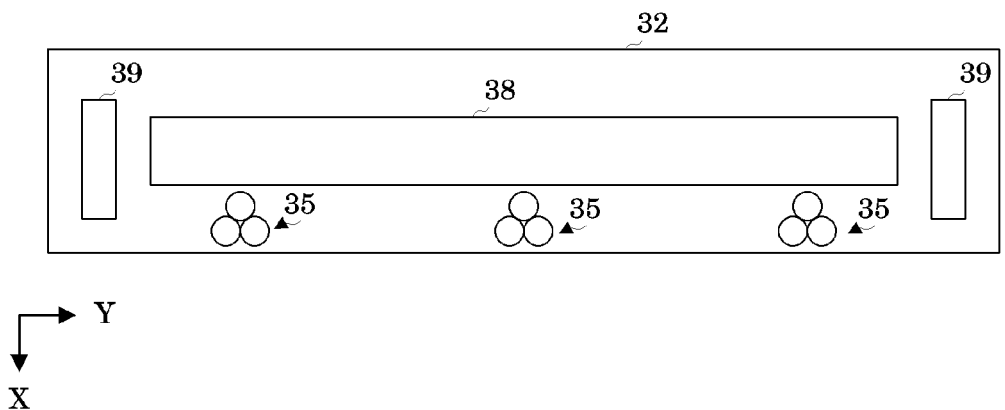
FIG. 6 is a bottom plan view of the scanner.

FIG. 6 shows a bottom plan view of the scanner 32. The scanner 32 has a bottom of rectangular shape elongated in the transport direction of the base material 92. The scanner 32 includes the light emitters 35 for emitting light to the base material 92, a light receiver 38 for receiving the light emitted from the light emitters 35 and reflected by the base material 92, and ridges 39 in form of rectangular parallelepipeds arranged in opposite end regions in Y-direction and extending parallel to the transverse direction of the scanner 32.

The light-emitters 35 have LEDs of the three colors of R (red), G (green) and B (blue), respectively, with the three-color LEDs blinking in response to an emission timing signal sent from the light-emitter controller 36. Luminous intensities also of the three colors are adjustably controlled by current values sent from the light-emitter controller 36. The light receiver 38 has CMOS sensors arranged linearly in Y-direction.

When the scanner 32 scans the base material 91 in X-direction, the ridges 39 act as pressers to smooth out any wrinkles of the base material 91. Consequently, the distance between the base material 91 and light receiver 38 can be kept constant. Although a scanner of the CIS type has a shallower depth of field than one of the CCD type, defocusing can be prevented by keeping the distance between the base material 91 and light receiver 38 constant. The ridges 39 are not limited to rectangular parallelepipeds, but may be cubes, hemispheres or ellipsoids. The ridges 39 may be arranged protrusible from and retractable to the bottom of the scanner 32, so that the ridges 39 may protrude from the bottom of the scanner 32 only when printing a base material 91 like perforated paper prone to wrinkling, and may be contained in the bottom of the scanner 32 in the case of a base material 91 which does not wrinkle easily.

The scanner moving mechanism 34 is in form of a rack and pinion, for example, for causing the scanner 32 to scan in the width direction at a scan speed and with scan timing instructed by the scanner controller 33.

Figure 7:
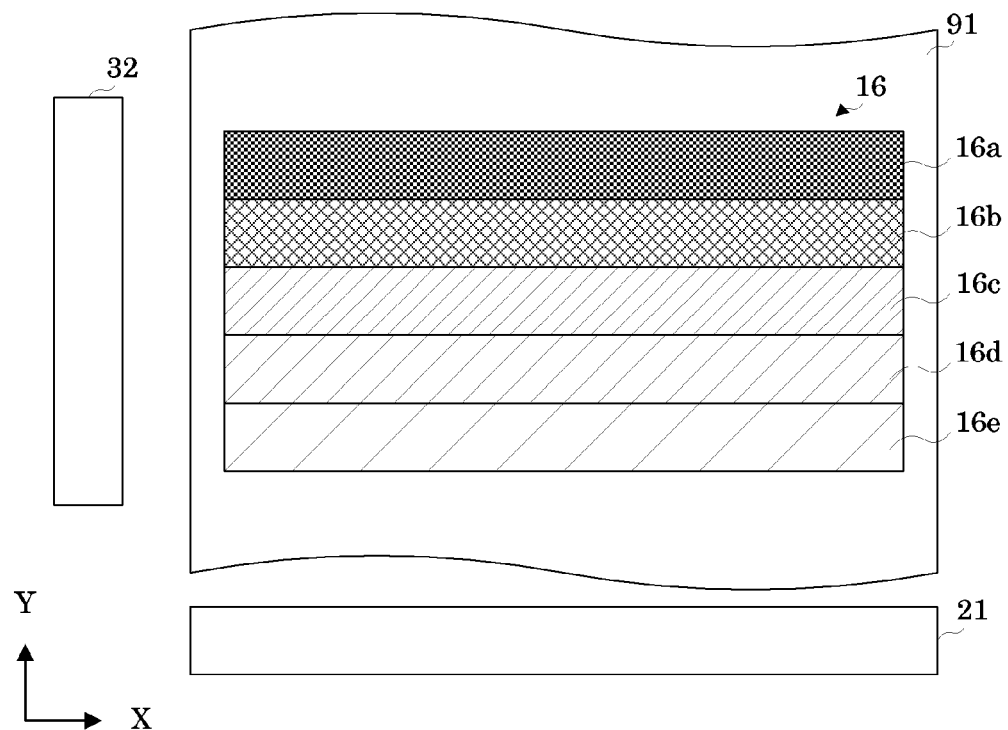
FIG. 7 is an explanatory view showing charts for shading correction.

FIG. 7 shows one example of the charts for shading correction 16. The charts for shading correction 16 are in form of charts of density in n-stages of each color of Y, M, C and K. FIG. 7 shows five-stage charts 16a-16e of a certain color. In one example of density, the charts for shading correction 16a-16e are in the half-tone dot percentages of 100%, 80%, 60%, 30% and 10%, respectively. These dot percentages are values corresponding to tone values of density. For example, 100% dot percentage corresponds to tone value 0, and 0% dot percentage to tone value 255.

FIG. 8 shows one example of print patterns of the charts for shading correction 16a and 16b. The charts for shading correction 16 have a correspondence relationship between the nozzles 27 and the print patterns. The correspondence relationship between the nozzles 27 and the print patterns can be clarified, for example, by dividing, in Y-direction, a print of each chart for correction into odd-numbered nozzles and even-numbered nozzles arranged in the width direction. Further, for one type of chart for correction, a plurality of dots are printed in Y-direction with one nozzle. An average of density values of these printed dots is calculated, thereby to acquire a highly reliable density value.

The scanner controller 33 sends instructions to the scanner moving mechanism 34 and light-emitter controller 36 in order to acquire image data of the charts for shading correction 16 with varied light exposure conditions. The light-emitter controller 36 adjusts the quantity of light emitted from the light emitters 35 according to the number of scans. For example, in a first scan, a quantity of light for appropriate exposure is emitted from the light emitters 35. In a second scan, a quantity of light for overexposure is emitted from the light emitters 35. As an example of varying the light exposure conditions for the charts for shading correction 16, the quantity of light from the light emitters 35 may be adjusted, or the scan time of the scanner may be adjusted.

As a method of adjusting the quantity of light from the light emitters 35, the time of emitting light from the LEDs may be adjusted. FIG. 9 (a) shows a timing signal for emission of light from the light emitters 35. FIG. 9 (b) shows lighting times of the light emitters 35 for appropriate exposure. FIG. 9 (c) shows lighting times of the light emitters 35 for overexposure.

When a timing signal for reading a chart for correction at Xth line corresponding to a nozzle number is inputted from the scanner controller 33 to the light-emitter controller 36, in the case of the scan for appropriate exposure, the light-emitter controller 36 controls the light emitters 35 to emit light for a corresponding, usual lighting time. In the case of the scan for overexposure, the light-emitter controller 36 controls the light emitters 35 to emit light for a corresponding time longer than the usual lighting time.

As another method of adjusting the quantity of light from the light emitters 35, the light-emitter controller 36 may adjust the magnitude of current value supplied to the LEDs. That is, if the current value applied to the LEDs is a usual current value, appropriate exposure can be obtained. Excessive exposure can be obtained from application of a larger current value than usual.

As a method of adjusting the scan time of the scanner 32, the scanner controller 33 may adjust the scanning speed of the scanner 32. That is, appropriate exposure can be obtained when, on instructions of the scanner controller 33, the scanner moving mechanism 34 moves the scanner 32 at a usual speed normalized beforehand. Excessive exposure can be obtained by moving the scanner 32 at a speed slower than usual. Image data obtained in this way is stored in the memory 37, which is subsequently outputted to the image processor 41.

3. Image Processor

Referring to FIG. 5, the image processor 41 creates correction tables for nozzle shading based on the image data outputted from the reader 31. The image processor 41 includes an RGB value detector 42, a by-nozzle image data detector 43, a by-nozzle RGB detector 44, a memory 45, a density value converter 46, a target density value calculator 47, correction table creator 48, and a number of scans checker 49. The image processor 41 may be provided in the same CPU as the printer controller 4, or in a separate microprocessor.

The RGB value detector 42 detects image data as RGB values from the image data detected as luminance values of the charts for shading correction and outputted from the memory 37 of the reader 31, and the timing signal in response to which the light of each of RGB is emitted from the light emitters 35. The by-nozzle image data detector 43 detects the correspondence relationship with the respective nozzles 27 of the image data of the charts for shading correction outputted from the memory 37 of the reader 31.

The by-nozzle RGB value detector 44 detects image data of RGB values for each nozzle 27 from the image data detected as RGB values by the RGB value detector 42 and the correspondence relationship between each nozzle 27 and the image data detected by the by-nozzle image data detector 43.

The memory 45 has, stored beforehand therein, conversion tables from RGB values to density values. In this embodiment, two types of conversion tables are stored, which are an RGB value to density value conversion table for appropriate exposure, and an RGB value to density value conversion table for overexposure. It is preferable to provide an RGB value to density value conversion table corresponding to each scan condition. These RGB value to density value conversion tables are created by reading with the scanner 32 beforehand a patch for reference density measurement of OD (Optical Density) value at 0.0 to 4.0, and are stored as tables showing the correspondence relationship between RGB value and density value. In this embodiment, the RGB value to density value conversion tables are three types of two-dimensional tables for converting each of R value, G value and B value into a density value. However, such tables may be four-dimensional tables for converting three types of values, i.e. R value, G value and B value into density values.

The density value converter 46 converts the RGB values detected for the respective nozzles into density values based on the RGB value to density value conversion tables stored in the memory 45. At this time, the RGB values are converted into density values based on the RGB value to density value conversion table for appropriate exposure when the RGB values detected for the respective nozzles have been acquired by appropriate exposure, and based on the RGB value to density value conversion table for overexposure when the RGB values have been acquired by overexposure.

The target density calculator 47 calculates a target density for correction for the density of each of the charts for correction 16*a*-16*e* based on the density values converted by the density value converter 46. This target density is calculated, for example, as an average density value of density values of all the nozzles for each of the charts for correction 16*a*-16*e*.

Figure 10:
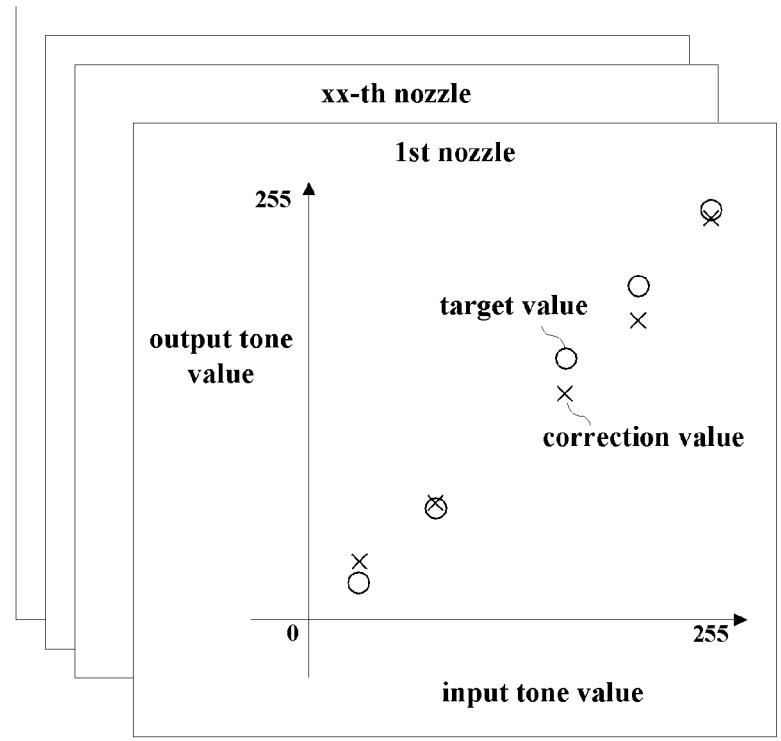
FIG. 10 is a graph showing a relationship between input tone value and output tone value.
Figure 11:
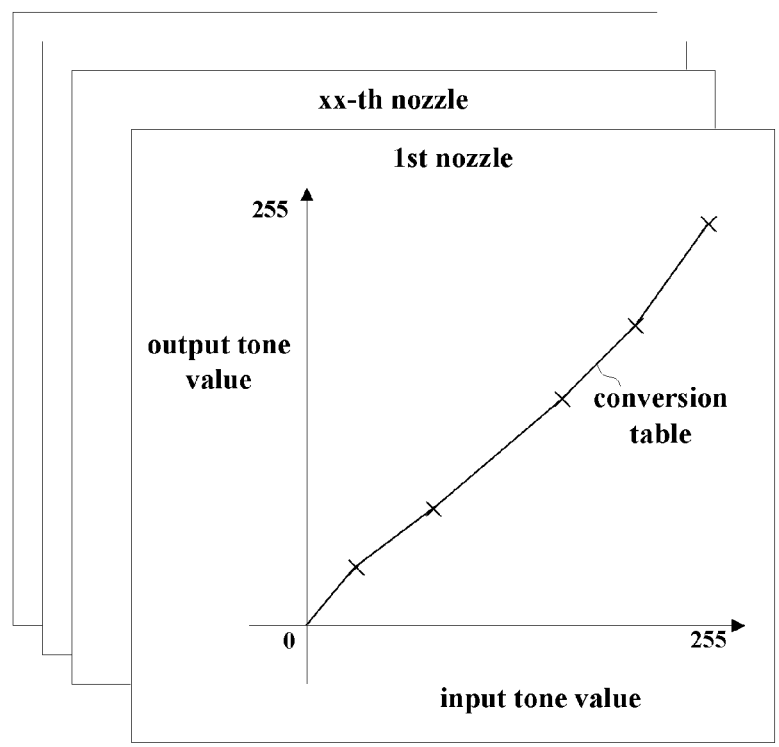
FIG. 11 is a graph showing a relationship between input tone value and output tone value.

The correction table creator 48, based on differences between the target densities calculated by the target density calculator 47 and the density values of the respective nozzles, calculates correction values for the respective nozzles to provide output tone values realizing the target values for respective input tone values corresponding to the image data of the charts for correction 16*a*-16*e*. The target densities and correction values are calculated for the respective nozzles as shown in FIG. 10. A shading correction table corresponding to all the input values is created for each nozzle from these correction values by interpolation or approximation (see FIG. 11). The created shading correction tables are stored in the memory 8 of the PC 5.

The number of scans checker 49 receives a signal whenever the scanner controller 33 outputs scan instructions for the scanner 32. With these signals, the number of scans checker 49 counts the number of scans of the scanner 32. When the number of scans reaches a predetermined number, the checker 49 outputs a scan completion signal to the target density calculator 47.

4. Nozzle Shading Correction

Figure 12:
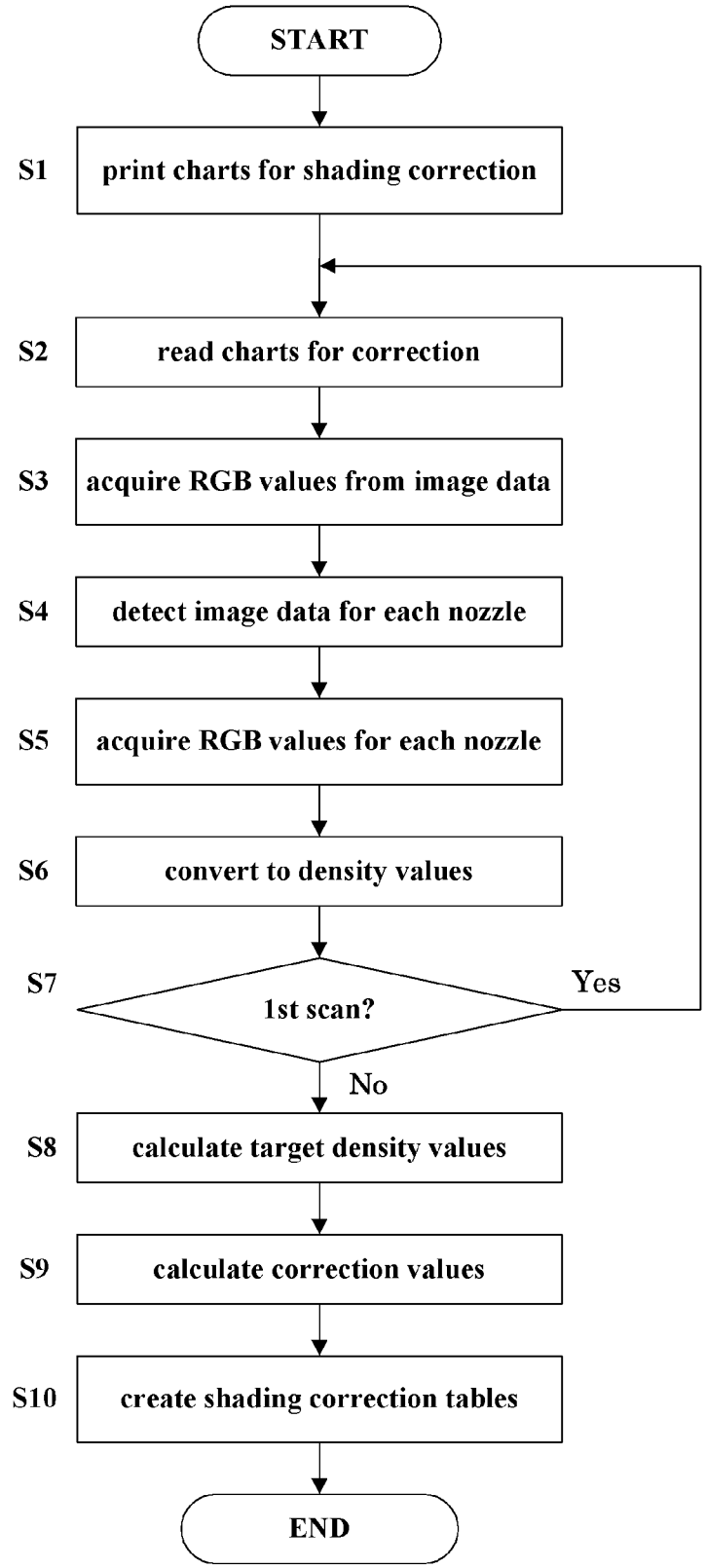
FIG. 12 is a flow chart showing a sequence of nozzle shading correction.

Next, a sequence of nozzle shading correction will be described with reference to FIG. 12. FIG. 12 is a flow chart showing the sequence of nozzle shading correction.

A printer operator inputs instructions for nozzle shading correction to the input unit 6. The instructions for nozzle shading correction are inputted from the input unit 6 to the printer controller 4 and transport mechanism 2. The printer controller 4 outputs the image data of the charts for shading correction 16 stored in the memory 8 to the head controller 26 of the printer 3. Based on the image data of the charts for shading correction 16, ink is discharged from each nozzle 27 of the discharge section 21 onto the base material 91 transported in Y-direction, whereby the charts for shading correction 16 are printed (step S1).

Next, the head controller 26 sends a signal indicating completion of printing of the charts for shading correction 16 to the scanner controller 33 and transport mechanism 2. The scanner controller 33 sends scan instructions to the scanner moving mechanism 34, and read start instructions to the scanner 32. The scanner moving mechanism 34 causes the scanner 32 to scan, in the width direction, the base material 91 whose transportation is suspended. Consequently, the charts for shading correction 16 printed on the base material 91 are read as image data (step S2).

The image data read is stored in the memory 37, and is outputted to the RGB value detector 42 and by-nozzle image data detector 43 of the image processor 41. The light-emitter controller 36 inputs to the RGB value detector 42 the timing signal of RGB light blinking emission from the light emitters 35. Image data is acquired as RGB values from image data detected as luminance values based on the image data of the charts for shading correction and the timing signal of RGB light blinking emission (step S3).

The by-nozzle image data detector 43 detects by-nozzle image data, which is a correspondence relationship between each nozzle 27 and image data, from the image data of the charts for shading correction inputted from the reader 31 (step S4).

The by-nozzle RGB value detector 44 receives the image data as RGB values from the RGB value detector 42, and the correspondence relationship between each nozzle 27 and image data from the by-nozzle image data detector 43. The by-nozzle RGB value detector 44 detects RGB values for the respective nozzles 27 from the image data as RGB values and the correspondence relationship between each nozzle 27 and image data (step S5). The by-nozzle RGB value detector 44 calculates an average value of RGB values from the image data of the plurality of detected RGB values arranged in Y-direction in the correction chart for each nozzle 27, and outputs this average value to the density value converter 46 as a RGB value for each nozzle 27.

The RGB value for each nozzle 27 is inputted from the by-nozzle RGB value detector 42 to the density value converter 46, and the RGB value to density value conversion table corresponding to the read condition at the time of acquiring this RGB value is inputted from the memory 45 to the density value converter 46. The density value converter 46 converts the RGB value for each nozzle 27 into a density value based on the RGB value to density value conversion table corresponding to the read condition at the time of acquiring this RGB value (step S6). The density value converter 46 outputs the converted density value to the target density calculator 47, and outputs a confirmation signal on the number of scans to the number of scans checker 49.

The number of scans checker 49 checks whether the number of scans by the scanner 32 has reached the predetermined number. If the scan of the charts for shading correction by the scanner 32 is the first scan, when a confirmation signal on the number of scans is inputted from the density value converter 46, the number of scans checker 49 instructs the scanner controller 33 to carry out the second scan (step S7, Yes). If the scan is the second scan, a scan completion signal is outputted to the target density calculator 47 (step S7, No). Since density data for two scans is outputted from the density value converter 46 to the target density calculator 47, the target density calculator 47 calculates target density values for correction of the densities of the respective charts for the correction 16a-16e (Step S8).

The calculated target density values for correction are outputted to the correction table creator 48. The correction table creator 48 calculates correction values for the densities of the respective charts for correction 16a-16e based on the target density values for correction inputted (Step S9). Since these correction values are values corresponding to typical density values n in number (five in this embodiment), correction values for the other density values are calculated by interpolation or approximation. For example, these are calculated by least mean square approximation, curve approximation, Lagrangian interpolation, spline interpolation, or the like. Consequently, correction values for all the density values of the respective nozzles are calculated, and the relationship between the density values and correction value are made into the shading correction tables (step S10).

The created shading correction tables are stored in the memory 8 of PC 5. When printing instructions for print image data desired by the printer operator are inputted from the input unit 6, the desired print image data and shading correction table stored in the memory 8 are outputted to the shading corrector 22. The shading corrector 22 corrects the tone values of the print image data (input tone values) corresponding to the nozzles 27 based on the shading correction table. The corrected print image data (output tone values) is inputted into the data rearranger 23 for rearrangement into print image data for the respective nozzles. The rearranged print image data is sent to the head controller 26, and based on this print image data, ink is discharged from the nozzles 27 of the discharge section 21.

According to the above nozzle shading method and the printing apparatus using this method, image data is read from the charts for shading correction 16 with the plurality of read conditions. The correction tables for nozzle shading are created based on the plurality of image data read. Therefore, even if the scanner 32 of the CIS type having a narrow dynamic range is employed, a high-precision shading correction can be made, to realize inkjet printing with a uniformed discharge from the respective nozzles.

Figure 13:
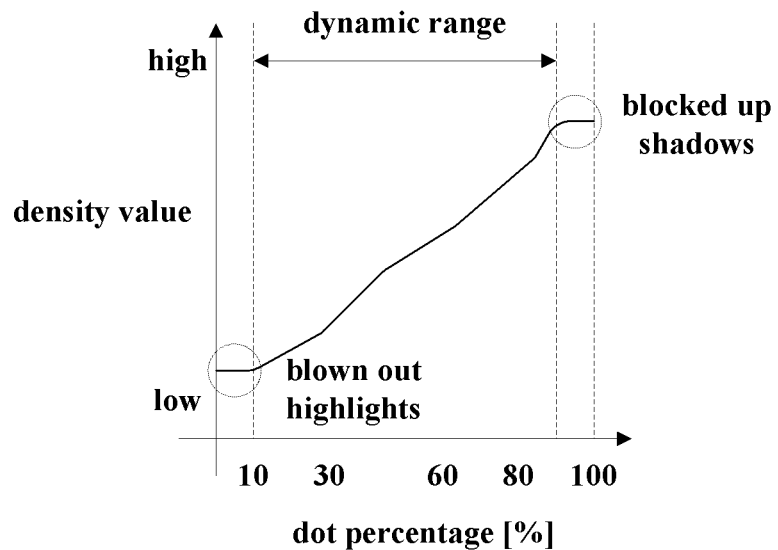
FIG. 13 is a graph showing a dynamic range of the scanner when a read condition is appropriate exposure.
Figure 14:
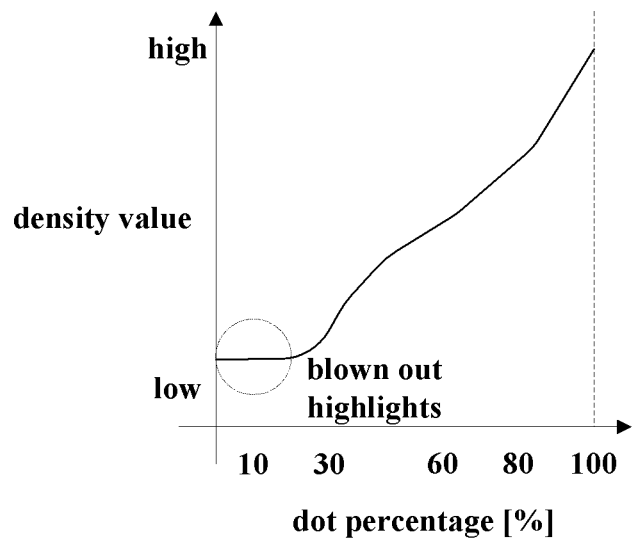
FIG. 14 is a graph showing a dynamic range of the scanner when a read condition is overexposure.
Figure 15:
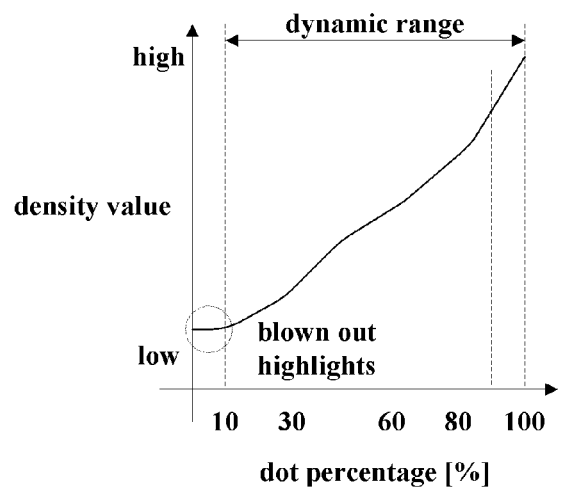
FIG. 15 is a graph showing a dynamic range of the scanner in time of two read conditions.

FIG. 13 shows a dynamic range of a chart for shading correction read by the CIS scanner when the read condition is appropriate exposure. That is, shown in this figure are density values relative to the dot percentages obtained from the RGB value to density conversion value corresponding to the read condition for appropriate exposure. Detection of the density values is saturated in locations of low density value and high density value, resulting in blown out highlights and blocked up shadows produced there. FIG. 14 shows density values relative to the dot percentages where the read condition is overexposure according to this embodiment. That is, shown in this figure are density values relative to the dot percentages obtained from the RGB value to density conversion value corresponding to the read condition for overexposure. When the read condition is for overexposure, a region of blown out highlights is larger where the dot percentage is small, than when the read condition is for appropriate exposure, but a region of blocked up shadows can be reduced where the dot percentage is large. A dynamic range as shown in FIG. 15 can be obtained by combining the density values detected with these two exposing conditions. This embodiment can prevent the blocked up shadows by further executing the read condition for overexposure besides appropriate exposure.

The CIS, which is smaller and costs less than the CCD, can contribute to space-saving and cost reduction. Further, by converting the luminance values acquired with different read conditions into density values serving as a unified reference, the correction tables for nozzle shading can be created with increased precision, thereby to improve the accuracy of nozzle shading.

Figure 16:
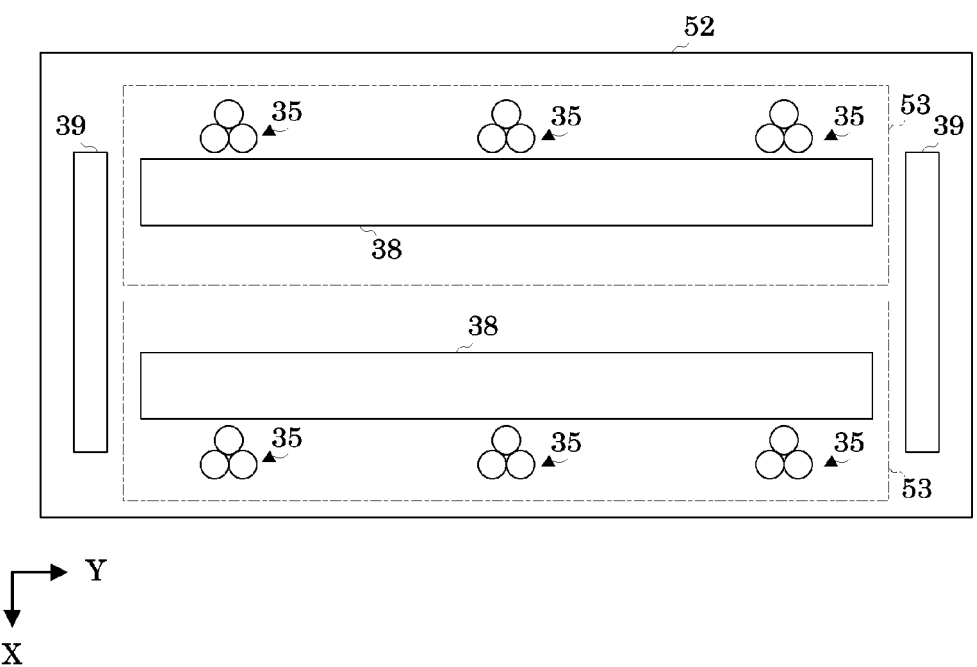
FIG. 16 is a bottom plan view of a scanner in a modified embodiment.
Figure 17:
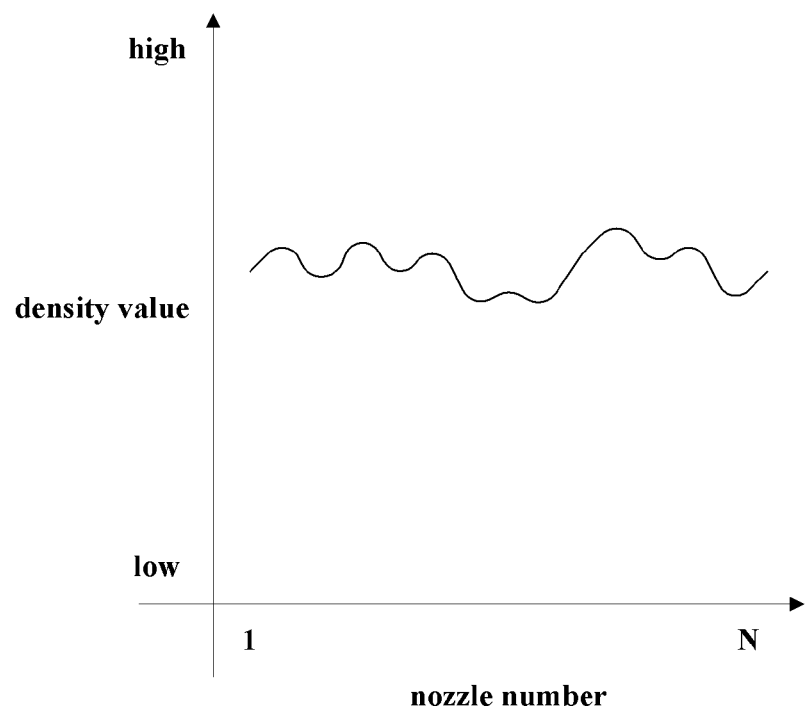
FIG. 17 is a graph illustrating density value variations among nozzles.
Figure 18:
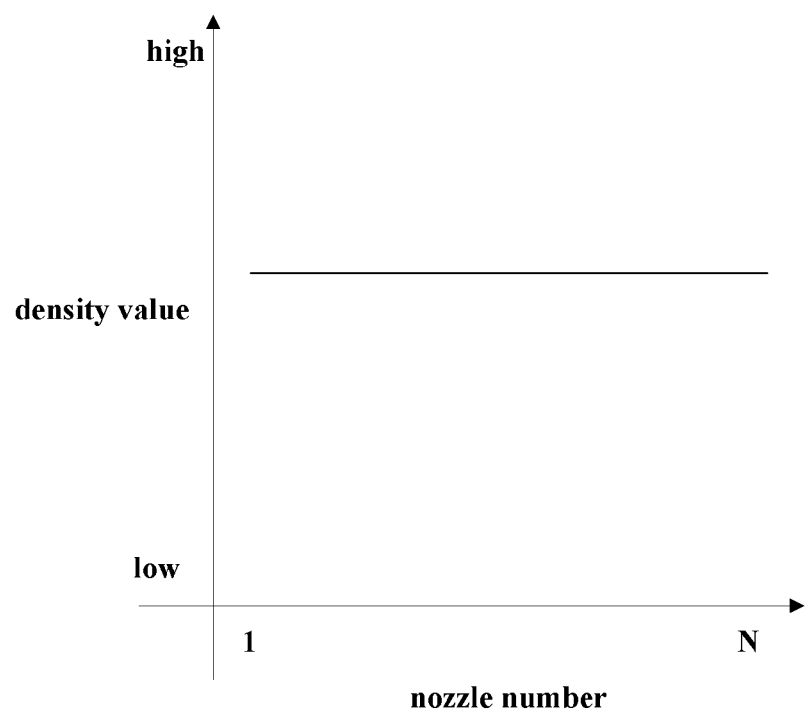
FIG. 18 is a graph showing uniforming of the density value variations among the nozzles.

This invention is not limited to the foregoing embodiment, but may be modified as follows:

(1) In the foregoing embodiment, the scanner 32 has only one light receiver 38. Instead, a plurality of light receivers 38 may be provided, along with the light emitters 35 which blink synchronously with the respective light receivers 38. As shown in FIG. 16, for example, two basic blocks 53 may be provided, each basic block 53 consisting of one light receiver 38 and a group of light emitters 35 each having three LEDs. Image data may be read with two read conditions by causing the scanner 52 to make one scan, with varied exposing conditions for emitting light from the light emitters 35 in each basic block 53.

(2) The foregoing embodiment employs two exposing conditions, one for appropriate exposure and the other for overexposure. Instead, the two conditions may be for appropriate exposure and for underexposure. By adding the condition for underexposure, blown out highlights can be corrected. Further, three conditions may be provided for appropriate exposure, overexposure and underexposure. With the conditions for overexposure and underexposure, both blocked up shadows and blown out highlights can be corrected, to secure a further enlarged dynamic range.

(3) The foregoing embodiment employs the RGB value to density value conversion table corresponding to each read condition. Instead, coefficients may be obtained from light quantity ratios based on RGB values of each read condition relative to a chart for shading correction of the same density, to unify relationships between dot percentage and density value of the charts for shading correction measured with a plurality of conditions.

This invention may be embodied in other specific forms without departing from the spirit or essential attributes thereof and, accordingly, reference should be made to the appended claims, rather than to the foregoing specification, as indicating the scope of the invention.

What is claimed is:

1. A nozzle shading method applicable to nozzles of an inkjet printing apparatus, comprising:
    a reading step for repeatedly reading charts for shading correction with a contact image sensor (CIS) type scanner with a plurality of read conditions consisting of varied exposure amounts, while emitting light from light emitters, thereby to obtain a plurality of image data with different read conditions;
    a density value converting step for converting luminance values of the plurality of image data read with the plurality of read conditions consisting of the varied exposure amounts into density values, respectively, based on a luminance value to density value conversion table corresponding to each of the plurality of read conditions consisting of the varied exposure amounts;
    a correction table creating step for creating nozzle shading correction tables corresponding to all input tone values, based on target density values for correction which are the plurality of density values converted and combined with density values having a region where detection of the density values is saturated; and
    a shading correcting step for carrying out shading correction based on the correction tables.

2. The method according to claim 1, wherein the plurality of read conditions are provided by changing a relative speed between the scanner and the charts for shading correction.

3. The method according to claim 1, wherein the plurality of read conditions are provided by changing a drive current value of the light emitters.

4. The method according to claim 1, wherein the reading step is executed by causing the CIS type scanner to repeatedly read entire areas of the charts for shading correction at a time with the plurality of read conditions consisting of the varied exposure amounts.

5. The method according to claim 1, wherein the region where detection of the density values is saturated is a region of high density value or low density value.

6. An inkjet printing apparatus comprising:
    a plurality of nozzles for discharging ink;
    a contact image sensor (CIS) type scanner for reading, as image data, charts for correction printed in the ink discharged from the nozzles;
    light emitters for emitting light to the charts for correction;
    a scanner controller for causing the scanner to repeatedly scan the charts for correction with a plurality of read conditions consisting of varied exposure amounts, thereby to obtain a plurality of image data with different read conditions;
    a density value converter for converting luminance values of the plurality of image data read with the plurality of read conditions consisting of the varied exposure amounts, into density values, based on a luminance value to density value conversion table correspond to each of the plurality of read conditions consisting of the varied exposure amounts;
    a correction table creator for creating nozzle shading correction tables corresponding to all input tone values, based on target density values for correction which are the plurality of density values converted by the density value converter and combined with density values having a region where detection of the density values is saturated; and
    a shading corrector for carrying out shading correction for the nozzles based on the correction tables.

7. The apparatus according to claim 6, wherein the scanner controller causes the scanner to scan with the plurality of read conditions provided by changing a relative speed between the scanner and the charts for shading correction.

8. The apparatus according to claim 6, wherein the scanner controller causes the scanner to scan with the plurality of read conditions provided by changing a drive current value of the light emitters.

9. The apparatus according to claim 6, wherein the light emitters are LEDs.

10. The apparatus according to claim 6, wherein the scanner includes ridges formed on bottoms of opposite ends thereof and extending parallel to a transverse direction of the scanner.

11. The apparatus according to claim 6, wherein the scanner controller causes the CIS type scanner to repeatedly read entire areas of the charts for shading correction at a time with the plurality of read conditions consisting of the varied exposure amounts.

12. The apparatus according to claim 6, wherein the region where detection of the density values is saturated is a region of high density value or low density value.

* * * * *